United States Patent Office 3,167,208
Patented Jan. 26, 1965

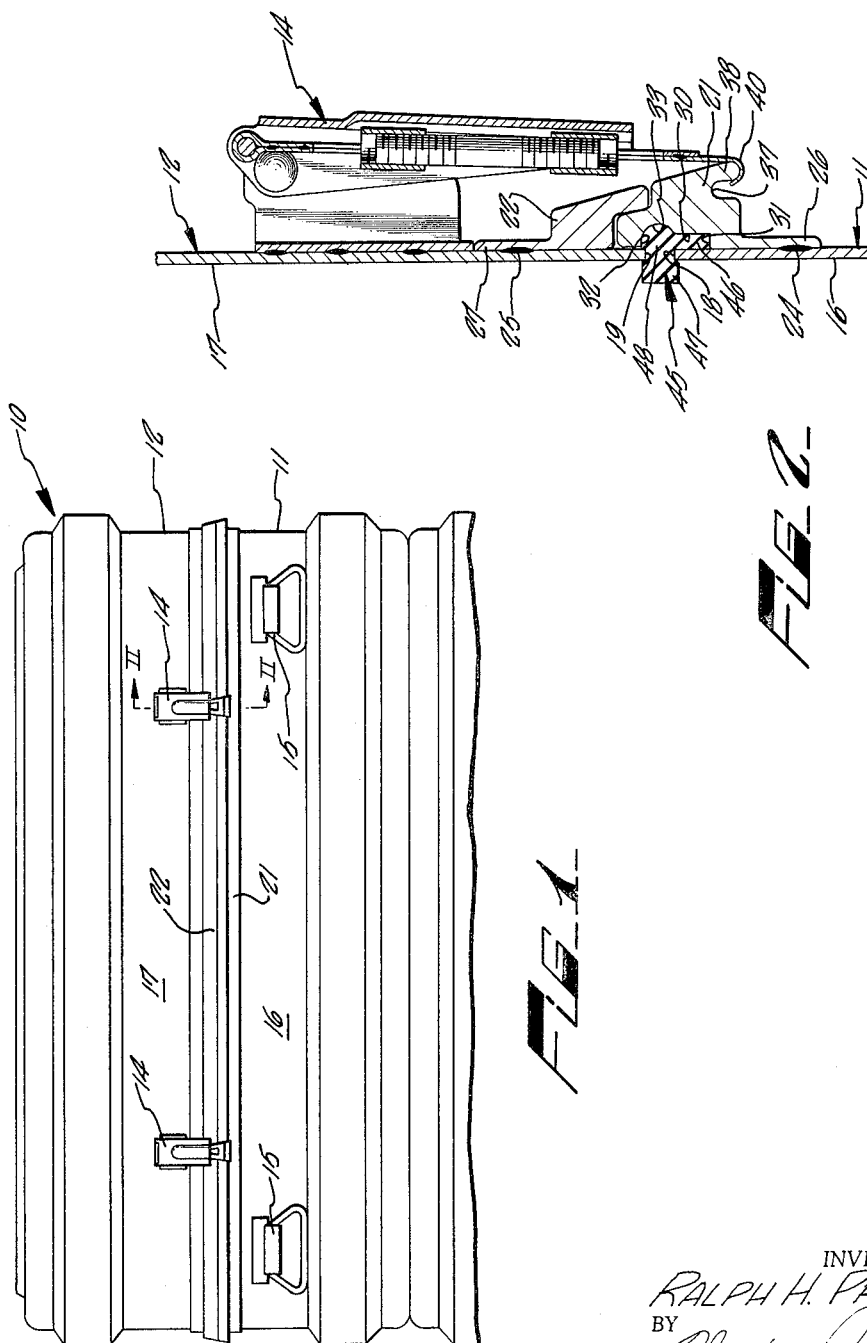

3,167,208
CONTAINER CLOSURE
Ralph H. Proctor, San Fernando, Calif., assignor to Royal Industries, Inc., Pasadena, Calif., a corporation of California
Filed July 23, 1962, Ser. No. 211,579
12 Claims. (Cl. 220—46)

This invention relates to improved container construction techniques and to sealing means for containers. More particularly, it relates to means for mounting a sealing strip between closable parts, which sealing strip is engaged directly by the container parts which enclose a storage space within the container.

The presentation of this invention is made in conjunction with a container for shipping electronic components for missiles, aircraft and the like. This type of container is selected as a vehicle for the description of this invention since the characteristics of such containers illustrate the problems which existed prior to the development of this invention. The characteristics of such containers appear in greater or lesser degree in other types of containers and, therefore, the teachings of this invention will be seen to have applications elsewhere.

An industry has recently developed which is devoted to the manufacture of containers for packaging delicate apparatus such as electronic equipment for transportation. The containers produced by this industry generally are large, lightweight containers which are particularly adapted to absorb shock, vibration and other loads in the container itself and thereby protect the contents of the container from damage. Such containers conventionally are fabricated from lightweight steel or aluminum sheet. In order that the contents of the containers may be protected from adverse climatic conditions, the containers are made airtight. In containers which have been provided prior to this invention, the methods for rendering the containers airtight have been costly and complicated.

Conventional containers of the class referred to generally have a pair of hollow shells which are connectable together so that a storage space is defined within the interior of the container. Conventionally, a steel or aluminum extruded member is secured to, or adjacent to, the peripheral edges of the container shells. An airtight sealing gasket or strip is mounted to one of these members for engagement by the other member when the container is locked into closed condition. To assure the desired airtight seal, the extruded members must be properly aligned with one another. The extruded members must be bent to conform to the periphery of the container shells, but the cross-sectional configurations required of the peripheral members of prior art containers are such that sharp bends cannot be made without causing distortion of the peripheral members. Such distortion adversely affects the alignment needed to maintain the desired airtight seal.

Also since the airtight seal is effected between the extrusions and not between the container shells themselves, it is necessary to maintain an airtight connection between the extrusions and the entire peripheral extent of the shells to which the extrusions are connected. The most common method of providing such an airtight connection between the extrusions and the shells is to apply a sealing weld completely peripherally of the container shell between each extrusion and its adjacent shell. This sealing weld is costly and time consuming to apply, particularly because the small thickness of the metal walls of the shells requires a carefully controlled arc.

This invention provides a container construction wherein the airtight seal between the container parts is effected directly between the container shells. Since the walls of the shells engage the gasket directly, there is no need to provide a sealing weld between the extrusions and the container walls. Also, this invention enables the use of extrusions which have improved cross-sections such that bending or rolling of the extrusions is faster and simpler. The improved cross-section is not distorted by the conventional material forming techniques normally used in fabricating such containers.

In broad terms, this invention comprises a container having a hollow receptacle part and a closure part adapted to engage the receptacle part to define a storage space internally of the container. Each container part has a peripheral edge which defines a limit of walls of the container and which is substantially aligned with the edge of the other part when the parts are disposed in space enclosing relation. A rim member is connected circumferentially to each container part adjacent to and spaced apart from the peripheral edge of said each container part. A recess is formed in one rim member in such manner as to open to the adjacent edge with the adjacent edge being disposed intermediate the width of the recess; the recess extends along the rim member around the entire extent of its container part. A resilient gasket member is disposed in the recess along the entire extent of the recess. A portion of the gasket member overlies the entire extent of the edge which is adjacent the recess. The container includes means for connecting the container parts together in closure relation, the said portion of the gasket member then being compressed between the edges of the container parts to provide an airtight seal with respect to the interior of the container.

These and other features and objects of the invention are more clearly presented in detail in the following description and explanation of the invention taken in conjunction with the accompanying drawings, wherein:

FIG. 1 is a elevational view of an improved container according to this invention;

FIG. 2 is an enlarged cross-sectional elevational view of the seal of the container as taken along line II—II of FIG. 1.

Referring initially to FIG. 1, there is illustrated a container 10 of a type specifically adapted for shipment of electronic missile components or other delicate equipment. As mentioned above, container 10 is selected for illustration merely by way of example for presenting an invention which has relation to container closure and sealing means generally. Container 10 has a configuration as presented generally in the co-pending patent application of Emery F. Koelsch, filed November 7, 1960, Serial No. 67,692 entitled Container and Interlocked Pack Thereof, issued on April 9, 1963, as Patent 3,084,830 and assigned to the assignee of this application, in that the container 10 is adapted to absorb shock loads in the shell of the container to protect the contents of the container from such shock loads. Generally, container 10 has a hollow-concave upwardly lower shell part 11 and a similarly configured concave downwardly upper shell part 12. The respective container shells or halves 11 and 12 of container 10 have cylindrical walls 16 and 17 fabricated from thin sheet metal such as aluminum. The shells have substantially parallel upper and lower surfaces extending between the cylindrical walls of the shells. In describing the container 10, the term "cylinder" is used with reference to the walls 16 and 17 in that a cylinder is defined as the surface generated by a line moving in space so as to be at all times parallel to a second fixed line. According to this definition, it is not necessary that a cylinder be circular. It is entirely proper that a cylinder according to the above definition be rectangular in cross-section.

As illustrated in FIG. 1 a pair of over-center turnbuckle-type latch mechanisms 14 are mounted to the upper shell 12 to engage the lower shell 11. A pair of lifting handles 15 are mounted to the container 10 on the side illustrated in FIG. 1. Desired additional lifting handles may be mounted on the ends and reverse side of the container.

The container shells 11 and 12 may be hingedly connected together, but it is also within the scope of this invention that the upper shell 12 may be completely removed from the lower shell through the provision of an additional pair of latch mechanisms 14 on the reverse side of the container (not shown).

The details of construction of container 10, and a comparison with the containers heretofore provided, may be had by reference to FIG. 2. In FIG. 2 the shells 11 and 12 of the container 10 are shown to be fabricated from thin sheet metal. The vertical cylindrical walls of the container shells are represented generally at 16 and 17. Each of the shell walls 16 and 17 extends to edges 18 and 19, respectively, which extend peripherally of the shells 11 and 12. When the shells 11 and 12 are secured together, the edges 18 and 19 are aligned with one another along their entire extent; that is, the plan outlines of edges 18 and 19 are congruent. A pair of members 21 and 22, preferably in the form of extrusions, are mounted to the upper and to the lower container parts 12 and 11, respectively, adjacent the peripheral edges 18 and 19 to reinforce the rim edges 18 and 19. Extrusions 21 and 22 extend circumferentially of the exterior of the container shells 11 and 12 adjacent the edges 18 and 19, respectively, but are spaced apart from the peripheral edges 18 and 19 of the container shells. Extrusions 21 and 22 are secured at intervals to the container walls 16 and 17 as, for example, by spot-welding as represented at 24 and 25. In the container provided by this invention, extrusions 21 and 22 are primarily reinforcing members to assure that deformation of the container walls 16 and 17 does not occur to provide misalignment between the edges 18 and 19. In prior art containers the extrusions 21 and 22 were also required to provide means for airtight sealing between the container halves.

Each of the extrusions 21 and 22 is shown to have a flange portion 26 and 27, respectively, defining a flat surface which is engaged with the exterior surfaces of the container walls 16 and 17 adjacent the edges 18 and 19. The flanges 26 and 27 extend from the bodies of the extrusions 21 and 22 only a distance sufficient to accommodate a spot-welding electrode tip whereby 21 and 22 may be secured to the walls 16 and 17. It is within the scope of this invention, however, that the extrusions 21 and 22 may be connected to the walls 16 and 17 by means other than spot-welding, as for example, by airtight rivets. It is only necessary that the mechanism for connecting the extrusions to the container walls maintain airtight integrity of the container walls. It is permissible, however, that air may pass along the interface between the extrusions and the container walls between the spot-welds. This normally is the case since the spot-welds 24 and 25 are spaced at approximately one and one-half inch (1½") intervals along the peripheral extents of the flanges 26 and 27.

As illustrated in FIG. 2, extrusion 21 extends above the edge 18 of the lower container part 11; FIG. 2 also shows that the shell edge 18 is spaced laterally from the reinforcing member 21. Member 21 includes a recess 30 along its entire extent peripherally of shell 11 adjacent edge 18, the recess 30 being open toward the edge 18. Recess 30 has a bottom wall 31 which is located below the peripheral edge 18 of container shell 11 and an upper wall 32 which is located above edge 18 so that the recess 30 is partially closed by container wall 16. An offset portion 33, extending away from edge 18, is provided in the horizontal recess 30 adjacent the upper wall 32. Reinforcing member 21 may have any desired cross-sectional configuration; it is necessary only however that a recess such as recess 30 be provided in member 21 and that member 21 be connected to the container wall 16 so that recess 30 is disposed adjacent the edge 18 with the edge 18 lying intermediate of the vertical extent of the recess.

Reinforcing members 21 and 22 are configured for mating engagement in order that the edges 18 and 19 of container parts 11 and 12 be guided into alignment as the upper container shell 12 is moved into closure relation with the lower shell 11. Further, as illustrated in FIG. 2, the reinforcing member 21 associated with the lower container shell 11 has a second recess 37 provided therein opening downwardly of the member to define a lip or flange 38 between recess 37 and the boundary of member 21 which is remote from wall 16. Flange 38 is adapted for engagement by a hook part 40 of the container latch mechanism 14. It is within the scope of this invention, however, that recess 37 may be deleted and that the hook part 40 engage a hook receiving fitting (not shown) connected to the lower container shell 11 independently of the reinforcing member extrusion 21.

A resilient gasket member 45 is disposed in recess 30 of the lower reinforcing member extrusion 21 to extend around the entire periphery of the container wall 16. The gasket or sealing element 45 preferably is fabricated from a rubber sponge material and has a generally L-shaped cross-section provided by an extension portion 46 and a body portion 47. The extension portion 46 extends at right angles from the body portion 47 and is disposed within the recess 30 circumferentially of container shell part 11. The body portion 47 of the gasket or seal 45 extends over the edge 18 of the lower container wall 16 toward the interior of the container. The configuration of the recess 30, as partially closed by the lower container wall 16 below edge 18, retains the gasket 45 within the recess. As illustrated in FIG. 2, the gasket body portion 47 has a bulb section 48 which is engaged within recess portion 33 to further secure and position the gasket within recess 30.

It was mentioned above that the reinforcing members 21 and 22 are mounted to the container walls 16 and 17, respectively, so that they are spaced from the walls adjacent the edges 18 and 19, respectively. Accordingly, when the upper container shell 12 is engaged in closure relation with the lower shell 11, as guided by the mating configuration of the upper and lower members 21 and 22, the edge 19 of the upper container shell wall 17 engages the body portion 47 of gasket 45. The latch mechanisms, such as the adjustable turnbuckle-type over-center latches 14, for securing the upper and lower container shells 11 and 12 into closed and sealed relation is such as to cause the gasket 45 to be compressed along its entire extent circumferentially of container 10 by the peripheral wall edges 18 and 19. This compressive engagement with seal strip 45 provides an airtight seal between the upper and lower container parts 11 and 12. It is therefore immaterial whether or not air is permitted to pass along the interfaces between members 21 and 22 and container walls 16 and 17, respectively.

In a container provided by the prior art, the gasket normally is disposed within upwardly opening recess in a member corresponding to lower reinforcing member 21. A downwardly extending tongue, provided peripherally of the upper container shell in a member corresponding to upper reinforcing member 21, engages the gasket in airtight sealing relation as the shells are forcibly engaged into locked condition. In a prior art container, the airtight seal to the gasket 45 thus is effected between the extruded circumferential members and not between the walls of the container as is provided by the structure shown in FIG. 2. It is therefore necessary in such prior art containers to prevent air from passing along the interfaces between the container walls and the extrusions. This prevention normally is accomplished by providing a sealing weldment completely circumferentially of each container shell part at the junction between the flanges 26 and 27 of the extrusions and the container walls. The present invention obviates the need for such sealing welds and provides a much improved container as a result. Additionally, the configurations of the extrusions required to provide the prior art sealing strip mounting presented problems in bending the extrusion. The extrusions used in prior art containers were configured such that portions of the extrusions were substantially removed from the neutral axis of the extrusion. As the extrusion was bent to conform to the cylindrical configuration of the walls of the container shells, the fiber stresses induced in the extremities of these extrusions led to deformation of the extrusion. This deformation often prevented the proper engagement between the extrusions such that the airtight seal with the seal strip was prevented. Accordingly, time consuming and expensive procedures were required in bending the prior art extrusions in order to prevent deformation. In the present invention, however, since the gasket is disposed between mating edges 18, 17 of the container walls and not between the extrusions 21, 22, the cross-sectional configurations of the extrusion used in the structure of the present invention may be designed to provide improved bending characteristics. Also, in the present invention deformation in the extrusion configuration is tolerable since the extrusions 21, 22 mate merely to guide the container parts 11, 12 into closure relation. No fine alignment between the extrusions is required to maintain an effective container seal.

It is seen that the extrusions 21 and 22 illustrated in FIG. 2 serve the function primarily of reinforcing the container walls 16 and 17 adjacent the edges 18 and 19, respectively, to assure alignment between the edges 18 and 19, whereby the airtight compressive engagement with the gasket 45 is effected. Secondarily, the extrusions 21, 22 of the present invention coact with the wall 16 of the lower container part 11 to mechanically secure the gasket or seal strip 45 in place. In devices of the prior art, the gasket 45 was required to be bonded or glued into its recess in the lower extrusion 21. The procedure of bonding or gluing the gasket 45 into place contributed materially to the cost of fabrication of such containers.

In the foregoing explanation of the invention, the reinforcing members 21 and 22 are referred to as extrusions. It is preferred, from economic considerations, that the members 21 and 22 be formed by extrusion techniques. It is fully within the scope of this invention that the reinforcing members be rolled, milled or formed by any other manufacturing process.

While the invention has been described above in conjunction with specific apparatus with reference to a particular type of container, this has been solely by way of example and should not be considered to limit the scope of this invention.

What is claimed is:

1. A container having a hollow receptacle part and a closure part, each part having a peripheral edge which is substantially aligned with the edge of the other part when the parts are engaged in container closure relation, a rim member connected circumferentially to each part adjacent the edge of said part, the edge of each part being spaced apart from its respective rim member, a recess in one rim member adjacent the entire extent of the corresponding edge and opening toward the said edge, a resilient gasket member disposed in the recess and having an extension overlying and disposed in contact with the said corresponding edge along the entire extent of said edge, and means for connecting together the container parts in closure relation whereby the gasket extension is engaged in compression over its entire extent between the container part edges to airtightly seal the interior of the container from the exterior of the container.

2. A container according to claim 1 wherein the receptacle part and the closure part are fabricated from sheet metal and the rim members are metallic extrusions.

3. A container according to claim 2 wherein each rim member is connected to its container part by spot-welding.

4. A container according to claim 1 wherein the rim members have mating convolutions for guiding the container parts into a predetermined alignment during closure of the container parts whereby the edges are vertically aligned over their entire extents.

5. A container according to claim 1 wherein one of the rim members includes flange means engagable with the means for connecting together the container parts in closure relation.

6. A container according to claim 1 wherein the resilient gasket member is maintained in position relative to the edge over which it lies solely by means of the configuration of the gasket member and of the recess.

7. A container having a hollow receptacle part and a closure part, each part having a peripheral edge which is substantially aligned with the edge of the other part when the parts are engaged in container closure relation, a rim member connected circumferentially to each part adjacent the edge of said part, the edge of each part being spaced apart from its respective rim member, a recess in one rim member adjacent the entire extent of the corresponding edge and opening toward the said edge, the container part to which the said one rim member is connected partially closing the recess, a resilient gasket member disposed in the recess and having an extension overlying the said corresponding edge along the entire extent of said edge, and means for connecting together the container parts in closure relation whereby the gasket extension is engaged in compression over its entire extent between the container part edges to airtightly seal the interior of the container from the exterior of the container.

8. A container according to claim 7 in which the gasket member has a substantially L-shaped cross-sectional configuration defined by a body portion and an extension portion, wherein the extension portion is engaged in interlocking relation with the recess between the rib member in which the recess is formed and the container part to which the recessed rib member is connected whereby the gasket member body portion overlies the edge of the said container part.

9. In a container paving a pair of airtight hollow shells connectable together to enclose a storage space internally of the container, each shell having a cylindrical wall portion and a circumferential peripheral wall portion edge which is substantially congruent to the peripheral edge of the other shell, the improvement residing in means for sealing the shells relative to one another in airtight closure relation, the means for sealing comprising a reinforcing member circumferentially and exteriorly of each shell adjacent the edge of its shell so that the edge of its shell is spaced apart from the reinforcing member, means for connecting each reinforcing member to its shell, whereby the airtight integrity of the respective shells is maintained, one of the reinforcing members having a recess formed therein adjacent the entire peripheral extent of the edge of its shell, a resilient element having a preselected cross-sectional configuration positioned in the recess and having a portion overlying the edge of the shell adjacent the recess, and means for securing the shells in closure relation so that the edges of the shells engage the resilient element as a gasket in airtight sealing relation.

10. In a container having a pair of airtight hollow shells connectable together to enclose a storage space internally of the container, each shell having a cylindrical wall portion and a circumferential peripheral wall portion edge which is substantially congruent to the peripheral edge of the other shell, the improvement residing in means for sealing the shells relative to one another in airtight closure relation, the means for sealing comprising a reinforcing member circumferentially and exteriorly of each shell adjacent the edge of its shell so that the edge of its shell is spaced apart from the reinforcing member, means for connecting each reinforcing member to its shell whereby the airtight integrity of the respective shells is maintained, one of the reinforcing members having a recess formed therein adjacent the entire peripheral extent of the edge of its shell, a resilient element having a preselected cross-sectional configuration positioned in the recess and having a first portion overlying the edge of the shell adjacent the recess and a second portion disposed in the recess between the said shell and its reinforcing member, and means for securing the shells in closure relation so that the edges of the shells engage the resilient element as a gasket in airtight sealing relation.

11. In a container having a pair of airtight hollow shells connectable together to enclose a storage space internally of the container, each shell having a cylindrical wall portion and a circumferential peripheral wall portion edge which is substantially congruent to the peripheral edge of the other shell, the improvement residing in means for sealing the shells relative to one another in airtight closure relation, the means for sealing comprising a reinforcing member circumferentially and exteriorly of each shell adjacent the edge of its shell so that the edge of its shell is spaced apart from the reinforcing member, means for connecting each reinforcing member to its shell whereby the airtight integrity of the respective shells is maintained, each reinforcing member being configured with respect to the other for guiding the edges of the shells into alignment during movement of the shells into closure relation, one of the reinforcing members having a recess formed therein adjacent the entire peripheral extent of the edge of its shell, a resilient element having a preselected cross-sectional configuration positioned in the recess and having a first portion overlying the edge of the shell adjacent the recess and a second portion disposed in the recess between the said shell and its reinforcing member, and means for securing the shells in closure relation so that the edges of the shells engage the resilient element as a gasket in airtight sealing relation.

12. In a container having a thin-walled cylindrical lower part and a similar thin-walled cylindrical upper part, each part being fabricated from sheet metal and having substantially congruent rim edges, and latch means mounted on one part adapted to receive means on the other part for securing the parts into container-closed relation, the improvement residing in means for airtightly sealing the container parts when the container parts are disposed in container-closed relation, the improvement comprising a rim reinforcing member secured circumferentially to the exterior of each container part adjacent the rim edge of each container part, each reinforcing member being secured to its corresponding container part by spot-welding, the reinforcing member secured to a first container part so that the rim edge of the first part lies intermediate of the vertical extent of said reinforcing member, each reinforcing member being configured so that the rim edge of the corresponding container part is laterally spaced from the reinforcing member adjacent thereto, a recess having upper and lower walls formed in the entire circumferential extent of the reinforcing member secured adjacent the first part rim edge and opening toward the first part rim edge, the first part rim edge being disposed intermediate of the walls of the recess, and a resilient sealing strip having a body portion and an extension portion disposed at substantially right angles thereto, the strip being disposed in the recess over the entire circumferential extent of the recess with the strip extension portion being disposed in the recess whereby the body portion extends transversely of first part rim edge, the body portion being compressively engaged between the upper and lower part rim edges to airtightly seal the container when the parts are secured in container closed relation.

References Cited in the file of this patent
UNITED STATES PATENTS
3,088,623     Parker _____ May 7, 1963